US012761019B2

(12) United States Patent
Nilsson

(10) Patent No.: US 12,761,019 B2
(45) Date of Patent: Oct. 13, 2026

(54) METHOD FOR DETERMINING THE CROSS-SECTIONAL AREA OF A TANK OF A PUMP STATION

(71) Applicant: Xylem Europe GmbH, Schaffhausen (CH)

(72) Inventor: Mikael Nilsson, Solna (SE)

(73) Assignee: Xylem Europe GmbH, Schaffhausen (CH)

( * ) Notice: Subject to any disclaimer, the term of this patent is extended or adjusted under 35 U.S.C. 154(b) by 249 days.

(21) Appl. No.: 18/721,340

(22) PCT Filed: Dec. 19, 2022

(86) PCT No.: PCT/EP2022/086548

§ 371 (c)(1),
(2) Date: Jun. 18, 2024

(87) PCT Pub. No.: WO2023/117839

PCT Pub. Date: Jun. 29, 2023

(65) Prior Publication Data

US 2025/0052566 A1 Feb. 13, 2025

(30) Foreign Application Priority Data

Dec. 20, 2021 (EP) .................................... 21215817

(51) Int. Cl.
*G01B 13/20* (2006.01)

(52) U.S. Cl.
CPC .................................... *G01B 13/20* (2013.01)

(58) Field of Classification Search
CPC ..................................................... G01B 13/20
See application file for complete search history.

(56) References Cited

U.S. PATENT DOCUMENTS 4,144,749 A * 3/1979 Whitmore ............... G01F 17/00 73/149
5,831,174 A 11/1998 Beaudoin
(Continued)

FOREIGN PATENT DOCUMENTS

CN 109974634 A * 7/2019 ............. G01B 13/20
EP 3187735 A1 7/2017
WO 9313389 A1 7/1993

*Primary Examiner* — Stephanie E Bloss
*Assistant Examiner* — Diana Hancock
(74) *Attorney, Agent, or Firm* — The Webb Law Firm

(57) ABSTRACT

The invention relates to a method for determining the cross-sectional area [A(H)] of a tank of a pump station within an interspace (Y). The method includes the steps of establishing the cross sectional area [A(H-seg)] of the tank in a sub-segment of the interspace (Y), operating the pump to transport liquid away from the tank and determining the pumped flow [Q(H-seg)] in the sub-segment, determining the pumped flow [Q(H)] in the interspace (Y) based on the determined sub-segment pumped flow [Q(H-seg)], operating the pump to transfer liquid away from the tank and by means of the liquid level sensor determining a liquid level change [ΔH(H)] in the interspace (Y), and determining the cross-sectional area [A(H)] of the tank within the interspace (Y), by dividing the interspace pumped flow [Q(H)] by the liquid level change [ΔH(H)], [Q(H)/ΔH(H)=A(H)].

13 Claims, 2 Drawing Sheets

(56) References Cited

U.S. PATENT DOCUMENTS

| | | | | |
|---|---|---|---|---|
| 2017/0038200 | A1* | 2/2017 | Stemkens .............. | G01B 13/20 |
| 2020/0003218 | A1 | 1/2020 | Beaudoin et al. | |
| 2023/0176563 | A1* | 6/2023 | Mökander ............. | F04B 49/065<br>702/183 |

* cited by examiner

METHOD FOR DETERMINING THE CROSS-SECTIONAL AREA OF A TANK OF A PUMP STATION

CROSS-REFERENCE TO RELATED APPLICATIONS

This application is the United States national phase of International Patent Application No. PCT/EP2022/086548 filed Dec. 19, 2022, and claims priority to European Patent Application No. 21215817.4 filed Dec. 20, 2021, the disclosures of which are hereby incorporated by reference in their entireties.

BACKGROUND OF THE INVENTION

Field of the Invention

The present invention belongs to the technical field of pump stations and methods for monitoring and controlling the operation of such pump stations, especially pump stations configured for pumping liquid comprising solid matter, such as wastewater. The pump station comprises a tank for temporary storage of a liquid and at least one pump configured for transporting the liquid away from the tank, the pump station further comprises an inlet for influent liquid, an outlet conduit connected to the pump, and a liquid level sensor.

The present invention belongs to the technical field of determining the cross-sectional area [A(H)] of a tank of a pump station within an interspace of the tank delimited by a pump start liquid level [START] and a pump stop liquid level [STOP], as a function of the height [H] taken from the bottom of the tank.

Description of Related Art

A pump station typically has a reservoir for holding a liquid, such as a well, a sump, a holding tank or a tank. In some pump stations, there may be multiple wells/sumps that are separated from or connected to each other. One or more pumps are used to transport liquid into or out of the reservoir.

A typical liquid reservoir for wastewater has an inlet to admit influent liquid to enter the tank and an outlet through which the liquid is transported/discharged from the tank. Each liquid reservoir has one or more pumps associated with the outlet. The pumps, when activated and in operation, transport the liquid, as required based on appropriate control signals. A single operator may have responsibility for many pump stations scattered over vast geographic areas, for instance the operator may have responsibility for hundreds or thousands of individual pumps. It is known to maintain and service pumps and pump stations at regular time intervals. However, this may result in pumps that are operating within acceptable parameters being serviced when not needed, and faulty pumps not being maintained when needed, thus resulting in failure. It is also known to monitor pump operating parameters, such as the individual pump efficiency (the electrical energy required to move a fixed volume of liquid), to determine whether a pump station is operating within acceptable parameters, and normal pump station service is based on the monitored parameters. However, each pump station operates under different conditions and in order to evaluate the operation, efficiency, throughput, etc. of a pump station, the volume/amount of pumped liquid is usually an essential/vital parameter.

There are known solutions available to add different types of flow measurement equipment to the outlet and/or inlet of the pump station in order to determine the volume/amount of pumped liquid. However, such installations are expensive, require service/audit at given intervals, etc., i.e. the flowmeters need to be verified/calibrated at regular interval which is cumbersome and has great negative impact on the operation of the pump station since they need to be removed in order to be verified/calibrated and/or replaced/serviced. Thereto all known flowmeters need to be arranged having straight sections of outlet pipes on both sides of the flowmeter in order to obtain useful/applicable measurements, i.e. require large space/footprint. Thus in practice, flow meters are only used at large pump station nodes in the pump station network, and not for the individual pump stations associated with one or a few households.

There are known solutions trying to determine the volume/amount of pumped liquid from minor pump stations without using flow meters, and these solutions presuppose that the cross-sectional area of the tank is constant and that the volume/amount of pumped liquid is directly proportional to the liquid level change during pumping. Thus, the volume/amount of pumped liquid is determined based on the liquid level change, and the measure is used to determine other conditions/properties of the pump station, such as efficiency, service interval based on pumped volume, etc.

However, the tank of a pump station does not have constant cross-sectional area but the tank has varying cross-sectional area and thereto comprises guide bars, pumps, discharge connections, outlet pipes, etc. having direct and varying effect on the relationship between the volume/amount of pumped liquid and the liquid level change during operation of the pump.

Thus, a presumption that the cross-sectional area of the tank is constant provide a big inaccuracy during the evaluation of the operation, status, etc. of the pump station.

SUMMARY OF THE INVENTION

The present invention aims at obviating the aforementioned disadvantages and failings of previously known pump station monitoring and control systems.

A primary object of the present invention is to provide an improved method for determining the cross-sectional area [A(H)] of a tank of a pump station as a function of the height [H] taken from the bottom of the tank, whereby the determined cross-sectional area of the tank may be used to obtain a better and more accurate determination of other conditions/properties of the pump station.

According to the invention at least the primary object is attained by means of the initially defined method as well as a pump station having the features defined in the independent claims. Preferred embodiments of the present invention are further defined in the dependent claims.

According to a first aspect of the present invention, there is provided a method for determining the cross-sectional area [A(H)] of a tank of a pump station within an interspace of the tank delimited by a pump start liquid level [START] and a pump stop liquid level [STOP], as a function of the height [H] taken from the bottom of the tank. The method is characterized by the steps of:

- establishing the cross sectional area [A(H-seg)] of the tank in a sub-segment of the interspace of the tank, as a function of the height [H] taken from the bottom of the tank,
- operating the pump to transport liquid away from the tank and determining the pumped flow [Q(H-seg)] in the sub-segment of the interspace of the tank, as a function of the height [H] taken from the bottom of the tank, determining the pumped flow [Q(H)] in the interspace of the tank, as a function of the height [H] taken from the bottom of the tank, based on the determined sub-segment pumped flow [Q(H-seg)], operating the pump to transfer liquid away from the tank and by means of the liquid level sensor determining a liquid level change [ΔH(H)] in the interspace of the tank, as a function of the height [H] taken from the bottom of the tank, and determining the cross-sectional area [A(H)] of the tank within the interspace of the tank, as a function of the height [H] taken from the bottom of the tank, by dividing the interspace pumped flow [Q(H)] by the liquid level change [ΔH(H)], [Q(H)/ΔH(H)=A(H)].

Thus, the present invention is based on the insight of using accurate input/data from a delimited subsegment of the relevant interspace of interest, in order to perform a considerably more accurate determination of the cross-sectional area of the tank for each level/height of the tank. Whereby the volume/amount of pumped liquid and other conditions/properties of the pump station can be determined with greater accuracy.

Thus, the operator does not need to apply different confidence intervals/adaptations and does not need to take any consideration/measures when a pump is exchanged by another pump and/or the number of pumps is altered.

According to various example embodiments of the present invention the sub-segment pumped flow [Q(H-seg)] is considered to be constant in the sub-segment, and the interspace pumped flow [Q(H)] is equal to the sub-segment pumped flow [Q(H-seg)]. Thus, the capacity of the pump, i.e. the pumped flow, is considered to be constant in the entire interspace between the pump start liquid level [START] and the pump stop liquid level [STOP]. This is a minor simplification having limited effect on the accuracy of the determination of the cross-sectional area of the tank.

In reality the Geodetic head (Hgeo) for the pump/pump station will vary over a pumping cycle in response to the changing liquid level in the tank during pumping, i.e. the Total head (Htot) for the pump/pump station that is directly dependent on the Geodetic head (Hgeo) will vary. When the Total head (Htot) is changing over a pumping cycle and the operational speed of the pump is constant, the pumped liquid flow will change in response thereto since the "pump curve" (pump specific condition/properties) is unaltered and the "system curve" (operational environment/condition of the pump station) changes. The independent claims embrace/include that the pumped flow is altered during a pump cycle.

According to various example embodiments of the present invention sub-segment pumped flow [Q(H-seg)] comprises addition of inflow data [IN(t)] that is representative for the inflow of liquid to the tank during the operation of the pump. Preferably, the inflow data [IN(t)] is determined based on measured inflow of liquid to the tank before and/or after the operation of the pump. By taking the inflow of liquid to the tank during the actual pumping into consideration, an even more accurate determination of the pumped flow can be performed. Alternatively, the determination of the cross-sectional area may be performed when the inflow of liquid is low and/or the inlet is temporarily closed.

According to various example embodiments of the present invention the axial distance between the pump start liquid level [START] and the upper limit of the sub-segment is equal to or more than 5% of the height of the interspace of the tank. Thereby the operation of the pump has entered steady state and the pumped flow is stable, rendering a more accurate determination of the pumped flow in the sub-segment.

According to another aspect of the present invention it is provided a pump station, wherein the pump station further comprises a control unit configured for executing the steps of the inventive method in order to determine the cross-sectional area [A(H)] of a tank of a pump station within an interspace of the tank delimited by a pump start liquid level [START] and a pump stop liquid level [STOP], as a function of the height [H] taken from the bottom of the tank.

The advantage of this embodiment is that such pump station provides for a simple, non-expensive and robust solution for determining the cross-sectional area of the tank.

In yet another aspect of the present invention it is provided a computer-readable storage medium having computer-readable program code portions embedded therein, wherein the computer-readable program code portions when executed by a computer cause the computer to carry out the steps of the inventive method in order to determine the cross-sectional area [A(H)] of a tank of a pump station within an interspace delimited by a pump start liquid level [START] and a pump stop liquid level [STOP], as a function of the height [H] taken from the bottom of the tank.

Further advantages with and features of the invention will be apparent from the following detailed description of preferred embodiments.

BRIEF DESCRIPTION OF THE DRAWINGS

The terms Fig., Figs., Figure, and Figures are used interchangeably in the specification to refer to the corresponding figures in the drawings.

A more complete understanding of the abovementioned and other features and advantages of the present invention will be apparent from the following detailed description of preferred embodiments in conjunction with the appended drawing, wherein.

DESCRIPTION OF THE INVENTION

Figure 1:
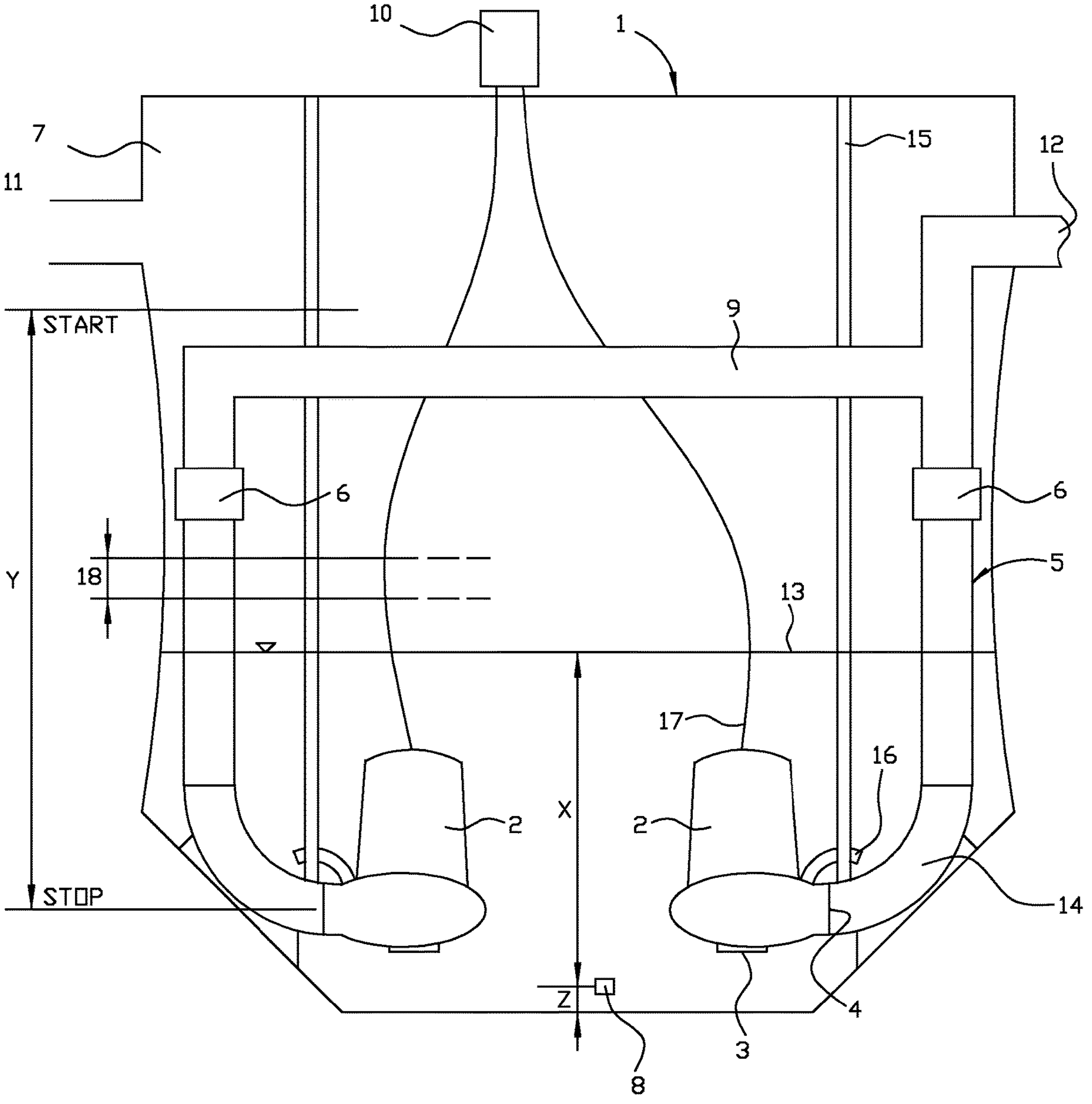
FIG. 1 is a schematic illustration of an example embodiment of a pump station according to the present invention.

The invention is applicable to a pump station and concern monitoring and control of a pump station. Reference is made to FIG. 1 schematically disclosing an illustrative pump station 1, e.g. a wastewater pump station. However other liquids may be pumped and in other types of environments, and the invention is not limited to wastewater or such pump stations even though the present invention will be described in connection with a wastewater pump station.

The pump station 1 comprises at least one pump 2 having an inlet 3 and an outlet 4, an outlet pipe 5 connected to the pump 2 and extending from the pump outlet 4, a non-return valve 6 arranged downstream the pump 2. The pump station 1 comprises a tank 7, also known as reservoir, sump, etc. configured for temporary storage of liquid. The pump 2 is configured for transporting the liquid away from the tank 7 via the outlet conduit 5. The pump 2 is preferably located in the tank 7, and the pump 2 may be located in partly or fully submerged position or in a dry position inside or outside the tank 7.

The disclosed pump station 1 also comprises a level sensor 8 located in the tank 7 and preferably in a position always submerged when the pump station 1 is in operation. Thus, the level sensor 8 is preferably located below the inlet 3 of the pump 2. According to various alternative embodiments the level sensor is constituted by a dry installed level sensor, e.g. using ultrasound, radar, etc., hanging above the liquid level and/or located outside the tank 8. Other types of level sensors are also conceivable. The level sensor is primarily used to determine when to activate and deactivate the pump 2.

Usually this type of pump stations 1 comprises at least two pumps, wherein the second pump is used to prevent flooding and/or as a backup if the first pump malfunctions and/or the two pumps alternate. The second pump having an inlet and an outlet, an outlet pipe 9 extending from the pump outlet and is connected to the outlet pipe 5 of the first pump 2. The outlet pipe 9 of the second pump preferably also comprises a non-return valve 6 arranged downstream the second pump. The non-return valves are arranged to prevent the pumped flow from one of the pumps to return to the tank 7 via the other pump, and also to prevent the liquid in the outgoing piping from returning to the tank 7 when all pumps are deactivated.

A local control unit 10 is operatively connected to the pumps 2 and different sensors in the pump station 1, and may further be operatively connected to a remote/external control unit (not shown). The local control unit 10 may by partly or fully located inside the pump 2. The pump station 1 comprises an inlet 11 for incoming/influent liquid and an outlet 12 for discharged/effluent liquid, the outlet 12 is part of the outlet pipe 5 and/or the outlet pipe 9. External outlet piping is connected to the outlet 12 and the external outlet piping guides the pumped liquid for example to another pump station and/or a wastewater plant. Everything described in connection with said at least one pump 2 is applicable also for the other pumps in the pump station 1. During operation of the pump station 1 the liquid level 13 in the tank 7 will rise and fall depending on the influent liquid and the operation of the pump 2. The level sensor 8 and the control unit 10 are configured to monitor the liquid level change [ΔH] during operation of the pump station 1, i.e. both when the pump 2 is in operation pumping liquid and when the pump 2 is inactive.

The part of the outlet pipe 5 located closest the pump 2 is constituted by a discharge connection 14. During installation of the pump 2, the pump 2 is guided downwards along a guide bar arrangement 15, usually two parallel cylindrical bars, extending from the top of the pump station 1 to the discharge connection 14. The pump arrangement comprises a connection element 16, also known as claw, running along the guide bar arrangement 15 during lowering and hoisting of the pump 2. When the pump 2 reaches the discharge connection 14 the connection element 16 engage a seat at the upper part of discharge connection 14 and the outlet 4 of the pump 2 is aligned with the inlet of the discharge connection 14. The weight of the pump 2 and the pivot point at the engagement between the engagement connection 16 and the discharge connection 14 secures a sealing effect between the pump arrangement and the discharge connection 14. An electric cable 17 is connected to the pump 2 and provides power to the pump 2 from an external part of the local control unit 10, the electric cable 17 may also comprise communication/data wires.

Figure 2:
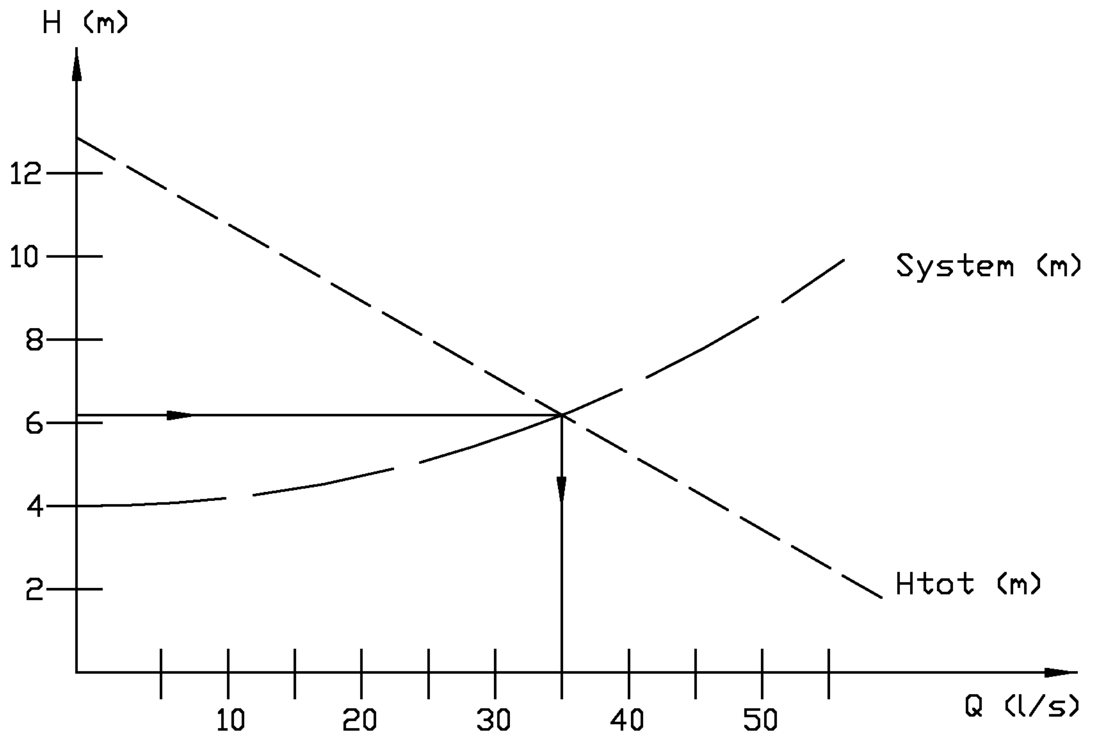
FIG. 2 is a schematic example diagram of a pump specific Q-Htot-relationship for a specific pump 2 and the Q-H-relationship for the specific pump station 1.

FIG. 2 illustrates a schematic example diagram of a pump specific Q-Htot-relationship for a specific pump 2 and the Q-H-relationship for the specific pump station 1. The broken/dashed line using short segments is the so-called "pump curve" and this is a fixed and known Q-Htot-relationship between pumped flow Q and Total head Htot for a given frequency (operational speed) of the specific pump 2. If the frequency (operational speed) of the pump 2 is adjusted/altered the "pump curve" line will move towards bottom-left and be steeper in response to the speed of the pump is decreased and will move towards top-right and be more horizontal in response to the speed of the pump is increased. Thus, the disclosed diagram is for a given operational speed for the pump 2. Some pumps 2 are operated direct on-line, i.e. at 100%, and the "pump curve" will be fixed. Some pumps 2 are operated using variable frequency and then the "pump curve" will move.

The broken/dashed line using long segments is the so-called "system curve" and this is specific for each pump station 1 and its special conditions (operational environment). The special conditions of the pump station 1 will decide the curvature of the "system curve". A different pump station 1 having the same type of pump 2 will have the same "pump curve" but a different "system curve" due to a different operational environment, i.e. different outlet conduit configuration/dimensions and especially the Geodetic head (Hgeo) of the pump station 1 will be different and thereby a different back pressure and thereby a different pumped Flow (Q). The Geodetic head (Hgeo) of the pump station 1 is the vertical distance between the liquid level 13 of the tank 7 and the highest elevation/crest of the outlet piping. Thus, the Geodetic head (Hgeo) will vary over a pumping cycle due to changing liquid level 13 in the tank 7. Thus, when the liquid level 13 is high the Geodetic head is low and during a pumping cycle the liquid level 13 decreases and the Geodetic head increases.

The operational duty point of the pump 2 for the specific pump station 1, i.e. the frequency or operational speed used by the pump 2, is illustrated by the intersection between said "pump curve" and said "system curve". The disclosed duty point of the pump 2 provides a pumped Flow (Q) equal to about 35 liters/second and a Total head (Htot) of the pump 2 equal to about 6.2 meters, i.e. the pump 2 will experience a back-pressure equal to about 6.2 meters water column and will be able to pump 35 liters per second at the given frequency (operational speed) of the pump 2.

The Geodetic head (Hgeo) for the pump/pump station will vary over a pumping cycle in response to the changing liquid level 13 in the tank 7 during pumping, i.e. the Total head (Htot) for the pump/pump station that is directly dependent on the Geodetic head (Hgeo) will vary. When the Total head (Htot) is changing over a pumping cycle and the operational speed of the pump is constant, the pumped liquid flow will change in response thereto since the "pump curve" (pump specific condition/properties) is unaltered and the "system curve" (operational environment/condition of the pump station) changes. When the liquid level 13 in the tank 7 is at the pump start liquid level [START] the Geodetic head (Hgeo) is less than when the liquid level 13 is at the pump stop liquid level [STOP]. Thus, at pump start the "system curve" is lower than disclosed in FIG. 2 and the pump flow is for instance about 38 litres per second, and at pump stop the "system curve" is higher than disclosed in FIG. 2 and the pump flow is for instance about 33 litres per second.

The "system curve" may be a theoretical/predetermined "system curve" provided for the specific pump station 1 or a real/measured "system curve" obtained on site. Knowing that the Total head (Htot) of the pump 2 is equal to the "system curve" at different pump operation duty points, a real "system curve" may be provided by operating the pump 2 at different operational speeds (operational duty points) providing different "pump curves" and a set of many intersections between different "pump curves" and measured pumped flows will make up a true/real "system curve". Thereto, when the pump 2 is active and at the highest operation duty point transporting no liquid, i.e. Q=0, the Dynamic head (Hdyn) of the pump 2 is zero and the Static head (Hstat) of the pump 2 is equal to the Total head (Htot) of the pump" and thereto there are no losses in the outlet piping and thereby the Static head (Hstat) of the pump 2 is equal to the Geodetic head (Hgeo) of the pump station 1, i.e. the "system curve" at zero flow. In the disclosed embodiment in FIG. 2 the momentary Geodetic head (Hgeo) of the pump station is equal to about 4 meters, i.e. for a specific/mean liquid level 13 in the tank 7.

The invention concerns how to determine the cross-sectional area [A(H)] of a specific tank 7 of a specific pump station 1, and the control unit 10 is configured to execute the steps of the inventive method. The cross-sectional area may only be determined within an interspace Y of the tank 7 as a function of the height [H] taken from the bottom of the tank 7. The interspace Y is delimited by the pump start liquid level [START] and the pump stop liquid level [STOP]. This knowledge of the cross-sectional area [A(H)] of the pump station 1 may be used to accurately determine the volume of the tank 7 between the pump start liquid level [START] and the pump stop liquid level [STOP], i.e. to accurately determine the pumped flow [Q] without using expensive and complicated flow sensors. The volume of the tank 7 is mathematically obtained by means of integral calculus of the cross-sectional area [A(H)] function between pump stop liquid level [STOP] and pump start liquid level [START], i.e. summarizing thin slices of the tank 7 having known cross-sectional areas. Thereto other specific properties of the pump station 1 may be determined based on the accurately determined pumped flow [Q] and/or the accurately determined volume of the tank 7 within the interspace Y. Going from the volume of the tank 7 within the interspace Y to pumped flow [Q], one need to handle the possible inflow of liquid to the pump station 1 during pumping.

The inventive method comprises the steps of:

- establishing the cross sectional area [A(H-seg)] of the tank 7 in a sub-segment 18 of the interspace Y of the tank 7, as a function of the height [H] taken from the bottom of the tank 7,
- operating the pump 2 to transport liquid away from the tank 7 and determining the pumped flow [Q(H-seg)] in the sub-segment 18 of the interspace Y of the tank 7, as a function of the height [H] taken from the bottom of the tank 7,
- determining the pumped flow [Q(H)] in the interspace Y of the tank 7, as a function of the height [H] taken from the bottom of the tank 7, based on the determined sub-segment pumped flow [Q(H-seg)],
- operating the pump 2 to transfer liquid away from the tank 7 and by means of the liquid level sensor 8 determining a liquid level change [ΔH(H)] in the interspace Y of the tank 7, as a function of the height [H] taken from the bottom of the tank 7,
- determining the cross-sectional area [A(H)] of the tank 7 within the interspace Y of the tank 7, as a function of the height [H] taken from the bottom of the tank 7, by dividing the interspace pumped flow [Q(H)] by the liquid level change [ΔH(H)], [Q(H)/ΔH(H)=A(H)].

The height [H] taken from the bottom of the tank 7 is the sum of the distance Z between the bottom of the tank 7 and the level sensor 8 and the distance X between the liquid level 13 and the level sensor 8.

The step of establishing the cross-sectional area [A(H-seg)] of the tank 7 in the sub-segment 18, may be performed in different ways. According to various embodiments the real value of the sub-segment cross-sectional area is input to the method, or the known diameter/area of the tank 7, the outlet pipe 5, the guide bars 15, the cables 17, etc. are input to the method. Thus, the present invention is based on the prerequisite that the sub-segment cross-sectional area is directly or indirectly known.

The diameter of the tank 7 in the sub-segment 18 is preferably constant, and the elements/components that are present in the sub-segment 18 preferably has constant cross-section, such that the sub-segment cross-sectional area is constant in the sub-segment 18.

The step of determining the pumped flow [Q(H-seg)] in the sub-segment 18, may be performed in different ways. According to various embodiments the pumped flow [Q(H-seg)] in the sub-segment 18, is determined based on the established sub-segment cross-sectional area [A(H-seg)] of the tank 7, or by means of a flow meter temporarily connected to the outlet 12 of the pump station 1, or by means of known "pump curve" and "system curve". According to a preferred embodiment the sub-segment pumped flow [Q(H-seg)] is determined by operating the pump 2 to transfer liquid away from the tank 7 and by means of the liquid level sensor 8 determining a liquid level change [ΔH(H)] in the sub-segment 18 of the interspace Y of the tank 7, as a function of the height [H] taken from the bottom of the tank 7, and multiplying the sub-segment cross sectional area [A(H-seg)] and the liquid level change [ΔH(H)], [A(H-seg)*ΔH(H)=Q(H-seg)]. This may be performed by operating the pump 2 in the sub-segment 18 only or by operating the pump 2 in the entire interspace Y. According to various embodiments, the sub-segment pumped flow [Q(H-seg)] is considered to be constant in the sub-segment 18.

The above-described step is preferably performed when there is no inflow of liquid to the to the tank 7, or during time periods of the day/week when the inflow of liquid to the tank 7 is known to be low, i.e. during the late night and rain free periods. According to various embodiments, in order to obtain an even more accurate determination of the sub-segment pumped flow [Q(H-seg)], the step of determining the sub-segment pumped flow [Q(H-seg)] comprises addition of inflow data [IN(t)] that is representative for the inflow of liquid to the tank 7 during the operation of the pump 2. Thus, when the inflow of liquid to the pump station 1 is considerable/extensive the liquid level change [ΔH(H)] when the pump 2 is in operation is much smaller than it should be and thereby the determination of the sub-segment pumped flow [Q(H-seg)] will become deceptive. The inflow of liquid may be determined by means of a flow meter. According to various embodiments the inflow data [IN(t)] is determined based on measured inflow of liquid to the tank 7 before and/or after the operation of the pump 2. This is performed by monitoring the liquid level change [ΔH(H)] just before and/or just after the operation of the pump 2 and the assumption that the inflow of liquid to the tank 7 during the time period the pump 2 is active is the same, an average, or the like. The derivative of the liquid level change [ΔH(H)] before and/or after the operation of the pump 2 may also be used to further obtain a more accurate assessment of the inflow of liquid during the time period the pump 2 is active. When the cross-sectional area of the tank 7 is not known, i.e.

the first determination, the cross-sectional area is considered constant when determining the inflow data [IN(t)], thereafter the determined cross-sectional area of the tank 7 is used in the next determination, etc., and/or the first determination is performed without taking the inflow data [IN(t)] into consideration.

The step of determining the pumped flow [Q(H)] in the interspace Y of the tank 7 based on the determined sub-segment pumped flow [Q(H-seg)], may be performed in different ways. According to various embodiments, the interspace pumped flow [Q(H)] is extrapolated from the sub-segment pumped flow [Q(H-seg)]. According to various embodiments the sub-segment pumped flow [Q(H-seg)] is considered to be constant in the sub-segment 18, and then the interspace pumped flow [Q(H)] is preferably set equal to the sub-segment pumped flow [Q(H-seg)], i.e. constant.

In order to obtain useful/best determinations of the properties related to the sub-segment 18, the pumped flow from the pump 2 shall preferably be stable. At the beginning of the pump cycle the pumped flow is ramped up and at the end of the pump cycle the liquid level 13 might become turbulent. According to various embodiments the axial distance between the pump start liquid level [START] and the upper limit of the sub-segment 18 is equal to or more than 5% of the height of the interspace Y of the tank 7, preferably equal to or more than 10%. According to various embodiments the axial distance between the pump stop liquid level [STOP] and the lower limit of the sub-segment 18 is equal to or more than 5% of the height of the interspace Y of the tank 7, preferably equal to or more than 10%.

Thereto it is preferred that the sub-segment 18 is located well above the pump 2 in order to easier establish the cross-sectional area in the sub-segment 18.

In order to obtain useful/best determinations of the properties related to the sub-segment 18, the sub-segment 18 shall not be too big or too small. A too large sub-segment 18 entails that it is harder to accurately establish the cross-sectional area of the sub-segment 18, and a too small sub-segment 18 entails that the accuracy of the determined sub-segment pumped flow [Q(H-seg)] decreases. According to various embodiments the height of the sub-segment 18 is equal to or less than 25% of the interspace Y, preferably equal to or less than 20%. According to various embodiments the height of the sub-segment 18 is equal to or more than 5% of the interspace Y, preferably equal to or more than 10%.

A computer-readable storage medium having computer-readable program code portions embedded therein, wherein the computer-readable program code portions when executed by a computer cause the computer to carry out the steps of the inventive method in order to determine the cross-sectional area [A(H)] of the tank 7 of the pump station 1 within the interspace Y of the tank 7 delimited by the pump start liquid level [START] and the pump stop liquid level [STOP], as a function of the height [H] taken from the bottom of the tank 7. The computer-readable storage medium is preferably arranged in the control unit 10.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

It shall be pointed out that the values of Y and Z may be programmed values or measured values.

The invention claimed is:

1. A method for determining the cross-sectional area [A(H)] of a tank of a pump station within an interspace (Y) of the tank delimited by a pump start liquid level [START] and a pump stop liquid level [STOP], as a function of the height [H] taken from the bottom of the tank, the tank of the pump station being configured for temporary storage of a liquid, wherein the pump station comprises an inlet for influent liquid, an outlet, at least one pump configured for transporting the liquid away from the tank via said outlet, and a liquid level sensor, the method comprising the steps of:

establishing the cross sectional area [A(H-seg)] of the tank in a sub-segment of the interspace (Y) of the tank, as a function of the height [H] taken from the bottom of the tank, operating the pump to transport liquid away from the tank and determining the pumped flow [Q(H-seg)] in the sub-segment of the interspace (Y) of the tank, as a function of the height [H] taken from the bottom of the tank, determining the pumped flow [Q(H)] in the interspace (Y) of the tank, as a function of the height [H] taken from the bottom of the tank, based on the determined sub-segment pumped flow [Q(H-seg)], operating the pump to transfer liquid away from the tank and by means of the liquid level sensor determining a liquid level change [ΔH(H)] in the interspace (Y) of the tank, as a function of the height [H] taken from the bottom of the tank, determining the cross-sectional area [A(H)] of the tank within the interspace (Y) of the tank, as a function of the height [H] taken from the bottom of the tank, by dividing the interspace pumped flow [Q(H)] by the liquid level change [ΔH(H)], [Q(H)/ΔH(H)=A(H)].

2. The method according to claim 1, wherein the sub-segment pumped flow [Q(H-seg)] is considered to be constant in the sub-segment, and the interspace pumped flow [Q(H)] is equal to the sub-segment pumped flow [Q(H-seg)].

3. The method according to claim 1, wherein the step of determining the sub-segment pumped flow [Q(H-seg)] as a function of the height [H] taken from the bottom of the tank, comprises the steps of:

operating the pump to transfer liquid away from the tank and by means of the liquid level sensor determining a liquid level change [ΔH(H)] in the sub-segment of the interspace (Y) of the tank, as a function of the height [H] taken from the bottom of the tank, and multiplying the sub-segment cross sectional area [A(H-seg)] and the liquid level change [ΔH(H)], [A(H-seg)*ΔH(H)=Q(H-seg)].

4. The method according to claim 1, wherein the sub-segment pumped flow [Q(H-seg)] comprises addition of inflow data [IN(t)] that is representative for the inflow of liquid to the tank-during the operation of the pump.

5. The method according to claim 4, wherein the inflow data [IN(t)] is determined based on measured inflow of liquid to the tank before and/or after the operation of the pump.

6. The method according to claim 1, wherein the height of the sub-segment is equal to or less than 25% of the interspace (Y), preferably equal to or less than 20%.

7. The method according to claim 1, wherein the height of the sub-segment is equal to or more than 5% of the interspace (Y), preferably equal to or more than 10%.

8. The method according to claim 1, wherein the axial distance between the pump start liquid level [START] and the upper limit of the sub-segment is equal to or more than 5% of the height of the interspace (Y) of the tank, preferably equal to or more than 10%.

9. The method according to claim 1, wherein the axial distance between the pump stop liquid level [STOP] and the lower limit of the sub-segment is equal to or more than 5% of the height of the interspace (Y) of the tank, preferably equal to or more than 10%.

10. The method according to claim 1, wherein the cross-sectional area [A(H)] of the pump station is used for determining the volume of the tank between the pump start liquid level [START] and the pump stop liquid level [STOP].

11. A non-transitory computer-readable storage medium having computer-readable program code portions embedded therein, wherein the computer-readable program code portions when executed by a computer cause the computer to carry out the steps of the method according to claim 1 in order to determine the cross-sectional area [A(H)] of a tank of a pump station within an interspace (Y) of the tank delimited by a pump start liquid level [START] and a pump stop liquid level [STOP], as a function of the height [H] taken from the bottom of the tank.

12. A pump station, wherein the pump station comprises a tank for temporary storage of a liquid, an inlet for influent liquid, an outlet, at least one pump configured for transporting the liquid away from the tank via said outlet, and a liquid level sensor, wherein the pump station further comprises a control unit configured for executing the steps of the method according to claim 1 in order to determine the cross-sectional area [A(H)] of the tank of the pump station within an interspace (Y) of the tank delimited by a pump start liquid level [START] and a pump stop liquid level [STOP], as a function of the height [H] taken from the bottom of the tank.

13. The pump station according to claim 12, wherein said at least one pump is arranged in the tank.

* * * * *